J. M. ALLEN.
SEPARATOR FOR STORAGE BATTERY PLATES.
APPLICATION FILED FEB. 24, 1920.
1,368,093.
Patented Feb. 8, 1921.
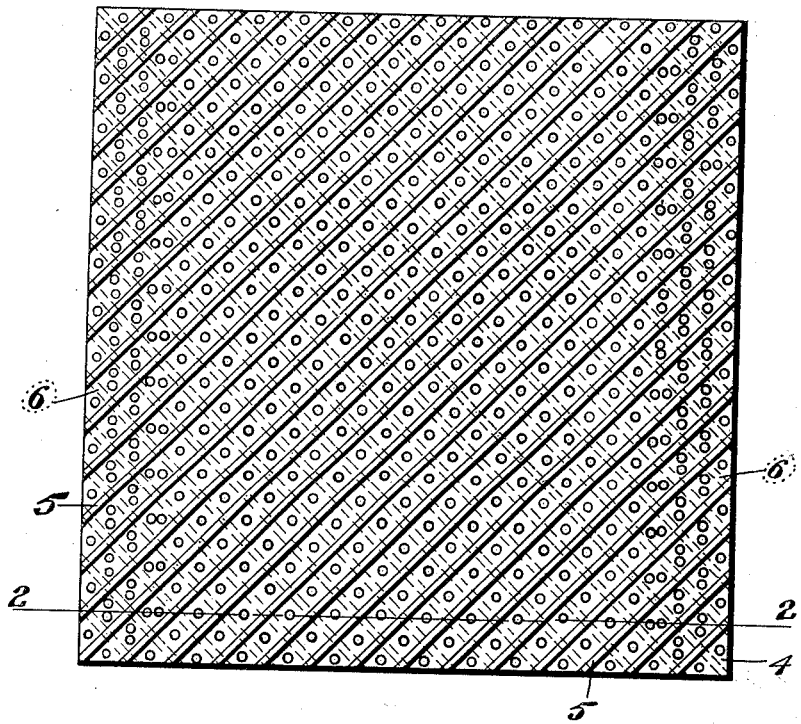
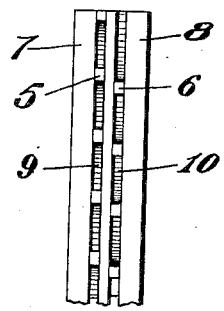
INVENTOR
JAMES M. ALLEN
BY Edward E. Lingau
ATTY.

UNITED STATES PATENT OFFICE.

JAMES M. ALLEN, OF ST. LOUIS, MISSOURI, ASSIGNOR TO JAMES M. ALLEN, FRED P. SMITH, AND FREDERICK D. TUCKER, TRUSTEES FOR THE SMITH-ALLEN BATTERY COMPANY, OF ST. LOUIS, MISSOURI.

SEPARATOR FOR STORAGE-BATTERY PLATES.

1,368,093. Specification of Letters Patent. Patented Feb. 8, 1921.

Application filed February 24, 1920. Serial No. 360,639.

*To all whom it may concern:*

Be it known that I, JAMES M. ALLEN, a citizen of the United States of America, and a resident of the city of St. Louis and State of Missouri, have invented certain new and useful Improvements in Separators for Storage-Battery Plates, of which the following is a specification containing a full, clear, and exact description, reference being had to the accompanying drawings, forming a part thereof.

My invention relates to separators for storage battery plates, and has for its primary object a separator composed of a sheet of reticulated non-conducting material which is provided on either side with resilient ribs of non-conducting material.

A further object is to construct a separator for storage batteries of a reticulated sheet of acid resisting non-conducting material, and vulcanized on either side thereof, a plurality of strips of resilient material extending diagonally across the two faces of the reticulated strips and in opposite directions on the opposite faces.

In the drawings:

Figure 1 is a face view of one of my separators;

Fig. 2 a sectional view taken on the line 2—2 of Fig. 1; and

Fig. 3 an enlarged fragmental view showing my separator interposed between two plates.

In the construction of my device I make use of a sheet of a reticulated material 4, this sheet being preferably of hard rubber or the like, so as to be relatively stiff. Extending diagonally across each face thereof are resilient strips 5 and 6, the strips 6 running in opposite directions to the strips 5. These strips are made preferably of live rubber, and are secured to the plate by being vulcanized thereon so as to form practically a solid plate provided with ribs. The purpose of these ribs is that when the separator is interposed between two battery plates as 7 and 8 the resilient ribs will contact with the faces of the plate, and being of resilient material will not have a tendency to scrape the plate or loosen the active material embedded therein.

My object in inclining the ribs 5 and 6 or extending them diagonally across the faces of the plate is to provide between the plate 4 and the battery plates 7 and 8 a plurality of inclined passageways 9 and 10. These will have a tendency to discharge the small particles of active material which constantly flake out due to the action of the electrolyte toward one side and bottom of the adjacent battery plates, and furthermore these passageways being inclined in movement of the battery will have a tendency to wash any of the sediment away from the separator along these passages, and will prevent the accumulation of the ribs which would be the case were the ribs made horizontal. It is understood of course that the number of reticulations between the ribs may vary as found most desirable, but in no event are they large enough to permit a long flake of active material becoming lodged through the openings and extending from plate to plate, and thus short circuit the cell; and another object in perforating or recticulating the plate is to allow freer action of one battery plate on the other by means of the electrolyte, as where solid non-conducting plates are used this action takes place around the edges of the separator, and consequently the edges of the battery plates become pitted and worn out before the center portion, due to their performing more work.

In case a separator such as wood or the like is used, the action of one plate on the other through the electrolyte will take place through the separator only after it has become saturated with the electrolyte, and in this case due to the pores of the wood being so small, a great deal of resistance is set up, which uses up a considerable amount of electric energy which could otherwise be utilized for a different purpose.

Having fully described my invention, what I claim is:

1. A separator for battery plates, comprising a rectangular reticulated sheet of hard rubber, a series of parallel soft rubber spacing strips, vulcanized on each face thereof, said strips being arranged at an angle of 45 degrees to the edges of the hard rubber sheet.

2. A separator for battery plates comprising a reticulated sheet of hard rubber, a series of parallel soft rubber strips, vulcanized to each face thereof, some of the strips on each side extending entirely from the upper horizontal edge of the plate to one of its vertical edges, and the remainder of said strips on said face extending from the opposite vertical edge to the horizontal edge, and the strips on the opposite face similarly extending in the opposite direction, whereby the disintegrated material, which forms between the strips, may be distributed and discharged to both sides and the bottom of the plate.

3. A separator for storage battery plates comprising a reticulated stiff sheet of acid-proof insulating material, a plurality of soft rubber strips secured to each face between the reticulations and so arranged that at least half of said strips on each face will terminate along one of the vertical edges of the plate.

4. A separator for storage battery plates comprising a relatively stiff sheet of hard rubber so reticulated as to leave solid portions extending at an angle of 45 degrees across its face and a plurality of soft rubber strips secured to the solid portions of the plate on both sides, said strips being arranged in opposite directions on the opposite faces of the sheet and adapted to contact with the battery plates and act as a cushion therefor.

In testimony whereof I have signed my name to this specification.

JAMES M. ALLEN.